United States Patent
Lin et al.

(10) Patent No.: US 11,640,166 B2
(45) Date of Patent: May 2, 2023

(54) METHOD, MOBILE DEVICE AND CLEANING ROBOT FOR SPECIFYING CLEANING AREAS

(71) Applicant: Nanning FuLian FuGui Precision Industrial Co., Ltd., Nanning (CN)

(72) Inventors: Yen-Hsin Lin, New Taipei (TW); Hsi-Chen Tsai, New Taipei (TW)

(73) Assignee: Nanning FuLian FuGui Precision Industrial Co., Ltd., Nanning (CN)

(*) Notice: Subject to any disclaimer, the term of this patent is extended or adjusted under 35 U.S.C. 154(b) by 88 days.

(21) Appl. No.: 17/361,649

(22) Filed: Jun. 29, 2021

(65) Prior Publication Data
US 2022/0413487 A1  Dec. 29, 2022

(51) Int. Cl.
*G05D 1/00* (2006.01)
*G06T 7/70* (2017.01)
(Continued)

(52) U.S. Cl.
CPC ....... *G05D 1/0016* (2013.01); *G05B 19/4155* (2013.01); *G05D 1/027* (2013.01);
(Continued)

(58) Field of Classification Search
CPC .. G05D 1/0016; G05D 1/0214; G05D 1/0246; G05D 1/027; G05D 1/0274; G05D 1/028; G05D 2201/0203; G05B 19/4155; G05B 2219/45098; G06F 3/0488; G06K 7/1417; G06T 7/571; G06T 7/70; H04W 76/14
See application file for complete search history.

(56) References Cited

U.S. PATENT DOCUMENTS

2014/0236477 A1 * 8/2014 Chen ............... G01S 13/865
701/450
2018/0289228 A1  10/2018 Xue et al.
(Continued)

FOREIGN PATENT DOCUMENTS

| CN | 104423797 B | 3/2018 | |
| CN | 112179361 A * | 1/2021 | .......... A47L 11/4011 |
| TW | 202115516 A | 4/2021 | |

OTHER PUBLICATIONS

English Translation of He (CN-112179361-A).*
English Translation of Lee (CN104423797A) provided by the applicant's IDS.*

*Primary Examiner* — Rami Khatib
*Assistant Examiner* — Shahira Baajour
(74) *Attorney, Agent, or Firm* — ScienBiziP, P.C.

(57) ABSTRACT

A method for specifying a cleaning area to a cleaning robot without an in-built map provides a hand-held mobile device capturing a two-dimensional code label arranged on a top of a cleaning robot parked on a charging base, and obtaining a positional relationship between the mobile device and the cleaning robot through the captured image. The cleaning robot is controlled to enter a cleaning mode under the guidance of the mobile device. With captured images, a user can specify an area within the environment for cleaning, and through a touch display screen can control the cleaning robot to go to the specified cleaning area for cleaning. The mobile device and the cleaning robot employing the method are also disclosed.

3 Claims, 8 Drawing Sheets

(51) Int. Cl.
*G06F 3/0488* (2022.01)
*G06T 7/571* (2017.01)
*G05B 19/4155* (2006.01)
*G06K 7/14* (2006.01)
*G05D 1/02* (2020.01)
*H04W 76/14* (2018.01)

(52) U.S. Cl.
CPC ........... *G05D 1/028* (2013.01); *G05D 1/0214* (2013.01); *G05D 1/0246* (2013.01); *G05D 1/0274* (2013.01); *G06F 3/0488* (2013.01); *G06K 7/1417* (2013.01); *G06T 7/571* (2017.01); *G06T 7/70* (2017.01); *G05B 2219/45098* (2013.01); *G05D 2201/0203* (2013.01); *H04W 76/14* (2018.02)

(56) References Cited

U.S. PATENT DOCUMENTS

| | | | |
|---|---|---|---|
| 2018/0322774 A1* | 11/2018 | Wang | G08C 17/02 |
| 2018/0344116 A1 | 12/2018 | Schriesheim et al. | |
| 2018/0345851 A1* | 12/2018 | Lavoie | B60Q 9/006 |

* cited by examiner

US 11,640,166 B2

METHOD, MOBILE DEVICE AND CLEANING ROBOT FOR SPECIFYING CLEANING AREAS

FIELD

The subject matter herein generally relates to robotic control, and more particularly, to a method for specifying cleaning areas, a mobile device and a cleaning robot.

BACKGROUND

In a cleaning robot, an application must be installed on a mobile device, and a cleaning area must be within an indoor map of the application installed in the cleaning robot. However, this control method is only applicable to mobile devices which have applications installed, and can only designate an area to clean on the indoor map, which is not convenient for all family members to use.

Governing a mobile device for certain areas to be cleaned that does not have such an application installed is problematic.

BRIEF DESCRIPTION OF THE DRAWINGS

Implementations of the present technology will now be described, by way of embodiment, with reference to the attached figures, wherein.

DETAILED DESCRIPTION

Figure 1:
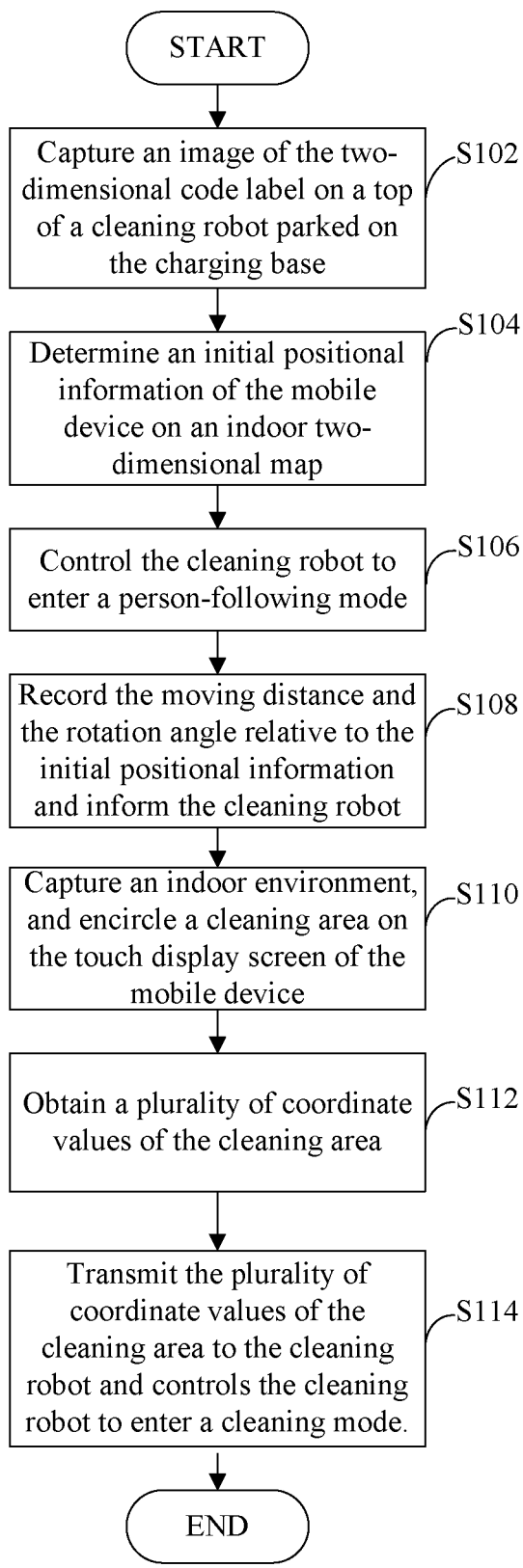
FIG. 1 is a flow chart of one embodiment of a method for specifying a cleaning area in mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a flowchart of a method applied in a mobile device for specifying an area to be cleaned by a robot, according to one embodiment. It should be noted that the mobile device may be a portable device such as a mobile phone or a tablet computer. As shown in FIG. 1, the method specifically comprises the following steps. According to different requirements, the order of the steps in the flowchart can be changed, and some steps can be omitted or added.

When a cleaning robot is used for the first time, the cleaning robot uses the location of a charger or charging base as origin "O" to establish a coordinate system, and after completing multiple cleaning tasks, establish an indoor two-dimensional map.

Figure 2:
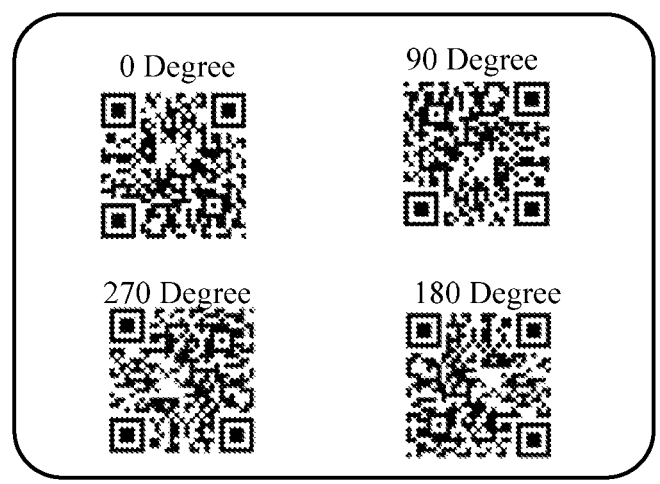
FIG. 2 is a schematic diagram of one embodiment of an angle of a two-dimensional code within the method of FIG. 1.

In one embodiment, the cleaning robot can select a plurality of reference points and record the coordinate values of each reference point while establishing the indoor two-dimensional map. The rules of selection of the plurality of reference points comprise: narrow walkways, obstacles, and must-pass passages. In this embodiment, a two-dimensional code label is arranged on the top of the cleaning robot. In this embodiment, the positional information comprises X-axis coordinate values, Y-axis coordinate values, and angle values of the map. For example, the positional information of the cleaning robot when charging and/or parking at the charging base (that is, coordinate origin "O") is marked as $(X_O, Y_O, \theta_O)$. The two-dimensional code label comprises a quick response matrix code. The characteristics of the quick response matrix (QR) code is that there are three patterns on the three corners of the two-dimensional code, which can be used to uniquely determine the angle of the two-dimensional code, as shown is FIG. 2. In this embodiment, the zero-degree direction of the two-dimensional code when the cleaning robot is parked on the charging base is taken as the zero-degree direction of the map, that is $\theta_O=0$ degree.

In step S102, a camera of the mobile device captures an image of the two-dimensional code label on the top of the cleaning robot parked on the charging base, then the mobile device establishes a wireless communication connection with the cleaning robot, and obtains an indoor two-dimensional map.

In this embodiment, a user holds the mobile device and scans the two-dimensional code label on the top of the cleaning robot parked on the charging base through the camera of the mobile device. The camera of the mobile device captures the image comprising the two-dimensional code label and the two-dimensional code of the two-dimensional code label is identified by well-known decoding algorithms to obtain the information carried in the two-dimensional code, where the information carried comprises the identification of the cleaning robot, and the wireless communication establishment method.

In one embodiment, the mobile device establishes a wireless communication connection with the cleaning robot according to the identification information of the cleaning robot and the wireless communication establishment method, and obtains an indoor two-dimensional map. In one embodiment, the wireless communication establishment method can comprise BLUETOOTH, WI-FI, and so on.

In step S104, the mobile device obtains the positional relationship between the mobile device and the cleaning robot according to the captured image, and determines an initial positional information of the mobile device on the indoor two-dimensional map.

Specifically, the mobile device calculates a distance between the camera and the two-dimensional code label by using optics or other range-finding algorithms. The distance is equivalent to the distance between the mobile device and the cleaning robot. The horizontal distance between the mobile device and the cleaning robot can be calculated by the distance. Finally, the positional relationship between the mobile device and the cleaning robot can be obtained according to the horizontal distance and the angle of the two-dimensional code in the captured image. The initial positional information of the mobile device on the indoor two-dimensional map is determined accordingly.

Figure 3A:
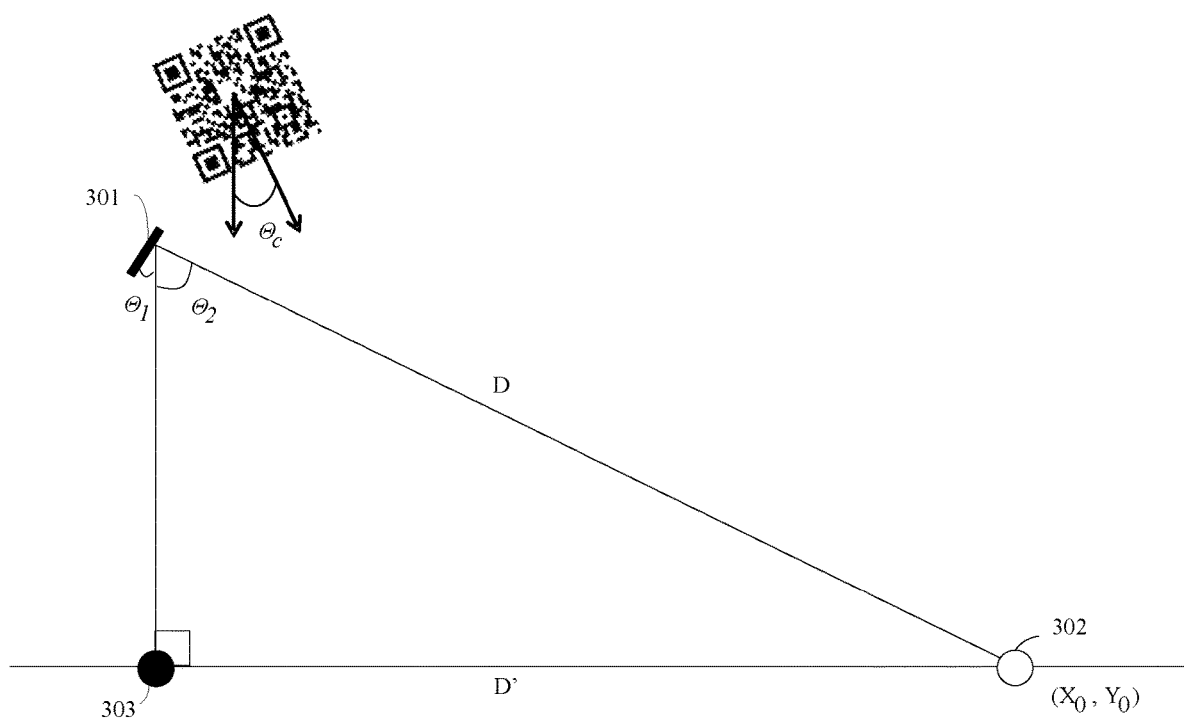
FIG. 3A is a schematic diagram of one embodiment of a positional relationship between a mobile device and a cleaning robot.
Figure 3B:
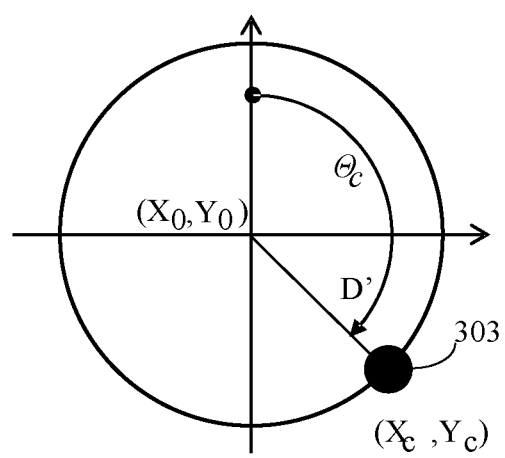
FIG. 3B is a schematic diagram of one embodiment for obtaining positional information of a mobile device.

In one embodiment, the positional relationship comprises a horizontal distance and an angle. As shown in FIG. 3A, the mobile device 301 uses the focal length of the camera to calculate the distance D between the mobile device 301 and the cleaning robot 302. $\theta_1$ is the inclination angle of the mobile device 301 with respect to the Z axis. Because the linkage of the two-dimensional code label to the center of the camera is perpendicular to the mobile device 301, $\theta_2=90$ degrees$-\theta_1$. Using D, $\theta_2$ and the following formula, the horizontal distance D' between the mobile device 301 and the cleaning robot 302 can be calculated:

$$D'=D\times\sin(\theta_2)$$

A rotation angle of the mobile device acquired by a gyro sensor in accordance with the angle of the two-dimension code in the captured image can be used to calculate the angle θc between the mobile device and the cleaning robot.

The horizontal distance D' and the angle θc between the mobile device 301 and the cleaning robot 302 can be used to calculate the X axis coordinate value and the Y axis coordinate value of the initial positional information of the mobile device 301 on the indoor two-dimensional map and obtain positional information in full concerning ($X_C$, $Y_C$, and θc).

In step S106, the mobile device transmits the initial positional information to the cleaning robot and controls the cleaning robot to enter a person mode.

In one embodiment, the information of the two-dimensional code further comprises webpage link information, and the mobile device can connect to the webpage to control the cleaning robot through webpage operations.

In step S108, the mobile device records the moving distance and the rotation angle relative to the initial positional information and informs the cleaning robot.

In one embodiment, the mobile device uses an inertial measurement unit to obtain the moving distance and the rotation angle of the mobile device during a movement, and regularly informs the cleaning robot of the moving distance (ΔX, ΔY) and the rotation angle (Δθ) according to the initial position information. The cleaning robot executes obstacle avoidance according to the received moving distance (ΔX, ΔY), the rotation angle (Δθ), and the indoor two-dimensional map.

In one embodiment, the mobile device also updates its current position according to the initial position information, the moving distance, and the rotation angle.

In one embodiment, the cleaning robot also uses the positional information of the plurality of reference points to correct current position of the mobile device during movements and notifies the mobile device to correct any positional error.

In step S110, the user uses the camera of the mobile device to capture an indoor environment, and encircles an area on the touch display screen of the mobile device to represent an area to be cleaned.

Figure 4:
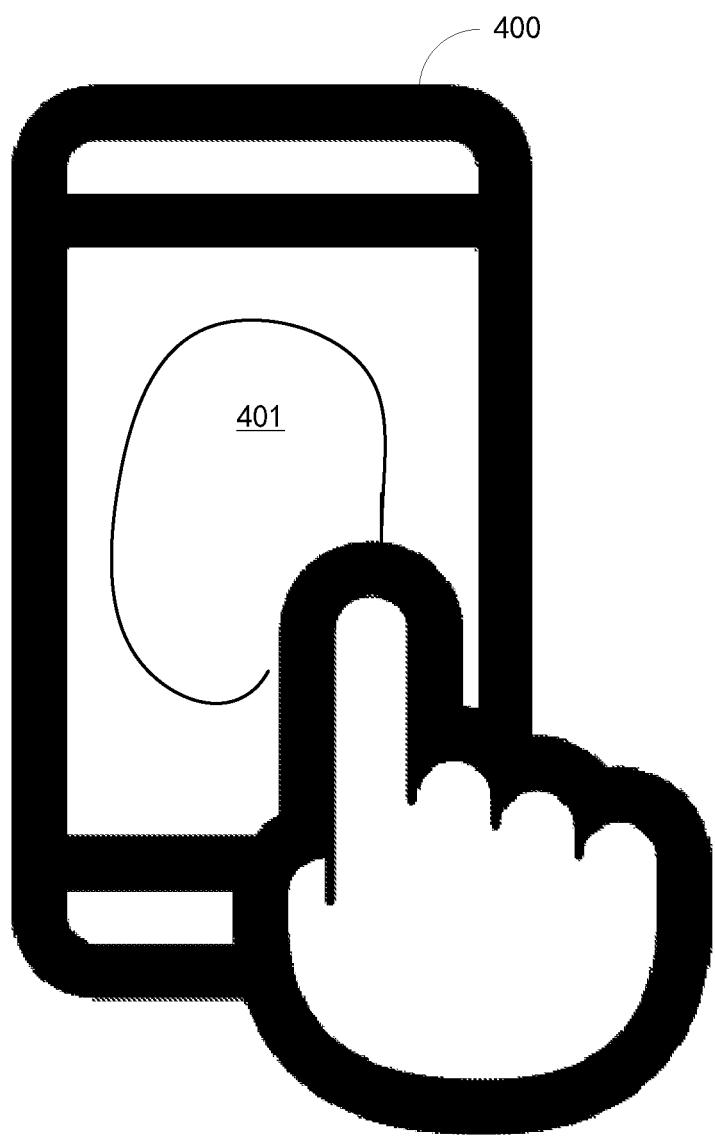
FIG. 4 is a schematic diagram of one embodiment for specifying a cleaning area through a touch display screen of a mobile device.

As shown in FIG. 4, the user can encircle the cleaning area 401 on the touch display screen of the mobile device 400.

In step S112, the mobile device determines the coordinate value of the center point of the indoor environment on the indoor two-dimensional map, and obtains a plurality of coordinate values of the cleaning area encircled by the user.

Specifically, the mobile device can calculate the distance between the camera and a center point of the indoor environment by using the focal length or other range-finding algorithms. The distance is equivalent to the distance between the mobile device and the center point of the indoor environment. The horizontal distance between the mobile device and the center point of the indoor environment can be calculated according to the distance between the mobile device and the center point of the indoor environment. The positional relationship between the mobile device and the center point of the indoor environment can be calculated based on the horizontal distance between the mobile device and the center point of the indoor environment, the cumulative rotation angle recorded by the mobile device, and the rotation angle corresponding to zero degrees of the indoor two-dimensional map. The mobile device can obtain the positional relationship between the mobile device and the center point of the indoor environment, and determine the coordinate value of the center point of the indoor environment on the indoor two-dimensional map based on the relative positional relationship based on the current position information of the mobile device. According to the coordinate value of the center point of the indoor environment, and the focal length, the plurality of coordinate values ($X_1$, $Y_1$), ($X_2$, $Y_2$), ..., ($X_N$, $Y_N$) of the cleaning area can be obtained.

In step S114, the mobile device transmits the plurality of coordinate values of the cleaning area to the cleaning robot and controls the cleaning robot to enter a cleaning mode.

After receiving the plurality of coordinate values of the cleaning area, the cleaning robot moves to the cleaning area specified by the user to perform cleaning according to the indoor two-dimensional map.

Figure 5:
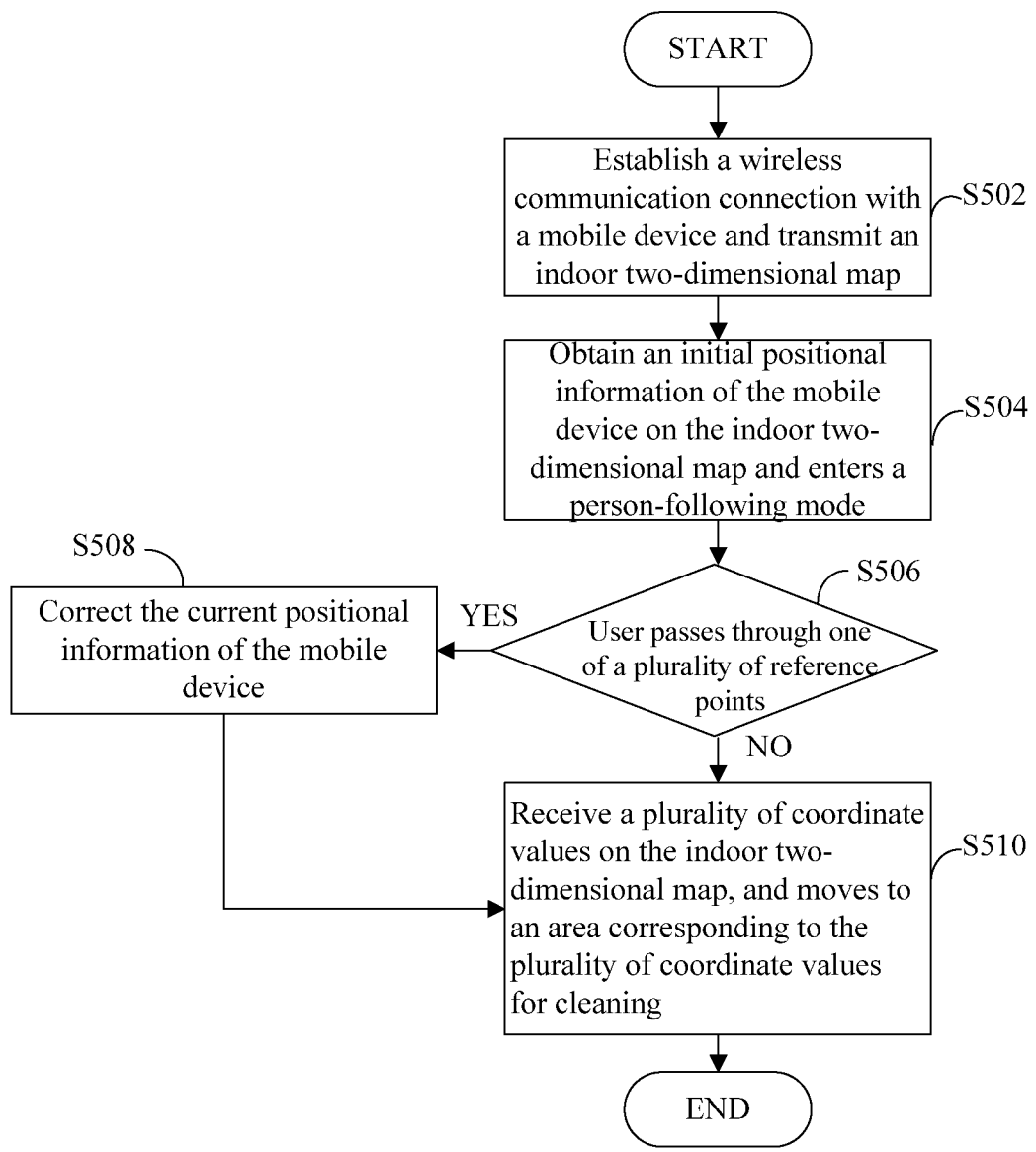
FIG. 5 is a flow chart of one embodiment of a method applied to a cleaning robot for specifying a cleaning area.

FIG. 5 illustrates a flowchart of the cleaning robot in a method for specifying the cleaning area according to one embodiment. As shown in FIG. 5, the method specifically comprises the following steps. According to different requirements, the order of the steps in the flowchart can be changed, and some steps can be omitted or added.

In step S502, the cleaning robot establishes the wireless communication connection with the mobile device and transmits the indoor two-dimensional map comprising the positional information of the origin point of the coordinates.

In step S504, the cleaning robot obtains the initial positional information of the mobile device on the indoor two-dimensional map and enters a person following mode according to a person following command transmitted from the mobile device and the initial positional information.

In the person following mode, the cleaning robot regularly receives the movement distance and the rotation angle transmitted by the mobile device, and performs obstacle avoidance according to the movement distance, the rotation angle, and the indoor two-dimensional map.

In step S506, the cleaning robot determines whether the user who is carrying the mobile device passes through one of the plurality of reference points. When it is determined that the user has passed through one of the plurality of reference points, step S508 is executed. If it is determined that the user has not passed any one of the plurality of reference points, step S510 is executed.

In one embodiment, the cleaning robot comprises a photographing unit for collecting images of the environment. The cleaning robot can determine whether the user passes through one of the plurality of reference points according to the collected environmental images.

In step S508, the cleaning robot uses the coordinate values of the reference points passed by the user to correct the current position information of the mobile device, and notify the mobile device of the corrections.

In step S510, the cleaning robot receives the plurality of coordinate values on the indoor two-dimensional map, and enters a cleaning mode according to a cleaning command transmitted from the mobile device, and moves to an area corresponding to the plurality of coordinate values for cleaning.

Figure 6:
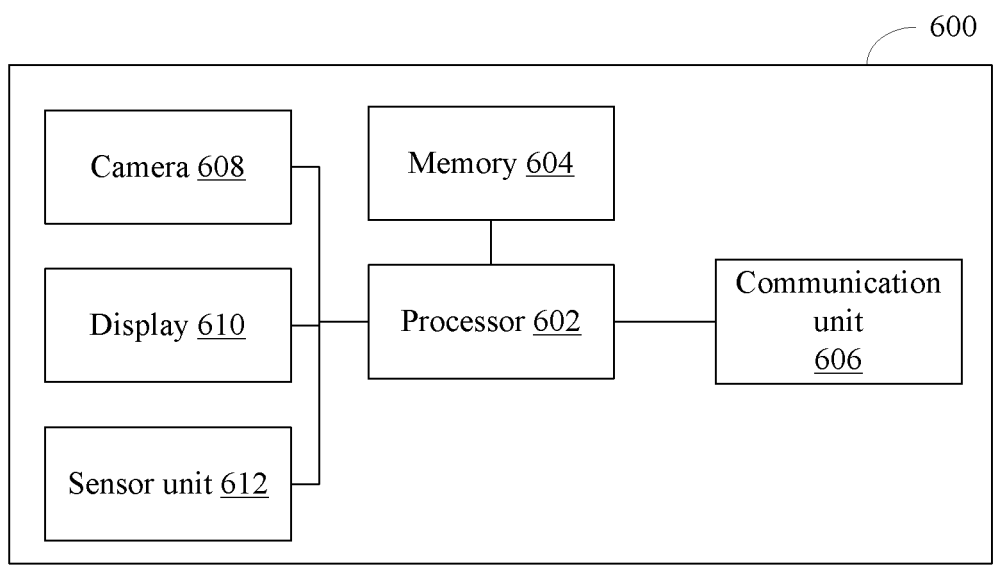
FIG. 6 is a block diagram of one embodiment of a mobile device.

FIG. 6 illustrates a block diagram of a mobile device 600 according to one embodiment.

The mobile device 600 comprises at least one processor 602, a memory 604, a communication unit 606, a camera 608, a display 610, and a sensor unit 612. It should be understood that the composition of the mobile device 600 shown in the FIG. 6 does not constitute a limitation. Other examples of the mobile device 600 may comprise more or less other hardware or software than those shown in the figures, or have different component arrangements.

In one embodiment, the at least one processor 602 comprises integrated circuits, for example, a single packaged integrated circuit, or multiple integrated circuits with the same function or different functions, including one or a combination of multiple central processing units (Central Processing Unit, CPU), microprocessors, digital processing chips, graphics processors, and various control chips. The at least one processor 602 is the control core (Control Unit) of the mobile device 600, which uses various interfaces and lines to connect various components of the mobile device 600, and runs or executes programs or modules stored in the memory 604. Data stored in the memory 604 can be called up to perform various functions and process data of the mobile device 600, for example, perform a cleaning function to a specified area. The processor 602 is also used to interact with other components.

The memory 604 comprises a read-only memory (Read-Only Memory, ROM), a programmable read-only memory (Programmable Read-Only Memory, PROM), and an erasable programmable read-only memory (Erasable Programmable Read-Only Memory, EPROM), one-time Programmable Read-Only Memory (OTPROM), Electrically-Erasable Programmable Read-Only Memory (EEPROM), CD-ROM (Compact Disc Read-Only Memory, CD-ROM) or other optical disk storage, magnetic disk storage, tape storage, or any other computer-readable storage medium that can be used to carry or store data.

The memory 604 stores program codes, and the at least one processor 602 can execute the program codes stored in the memory 604 to perform related functions. For example, the program code of the method flow of FIG. 1 is executed by the at least one processor 602, so as to realize the functions of the various modules to achieve the purpose of specifying the cleaning area.

In one embodiment, the memory 604 stores one or more instructions (that is, at least one instruction), and the at least one instruction is executed by the at least one processor 602 to achieve the purpose of specifying the cleaning area. For details, refer to FIG. 1 shown.

The communication unit 606 is used for wired or wireless communication between the mobile terminal 600 and other devices. The mobile device 600 can access a wireless network based on a communication standard through the communication unit 606, such as WI-FI, 2G, 3G, 4G, or 5G, or a combination thereof. In one embodiment, the communication unit 606 further comprises near-field communication (NFC), radio frequency identification (RFID), ultra-wideband (UWB), BLUETOOTH, and other technologies.

The camera 608 is used to capture images.

The display 610 comprises a touch display screen for receiving user instructions and displaying operation information and captured images, comprising receiving touch inputs from the user.

The sensor unit 612 comprises an inertial measurement unit for sensing movement of the mobile device 600, comprising data such as acceleration, angular velocity, magnetic force, and pressure of the mobile device 600 during movement.

Figure 7:
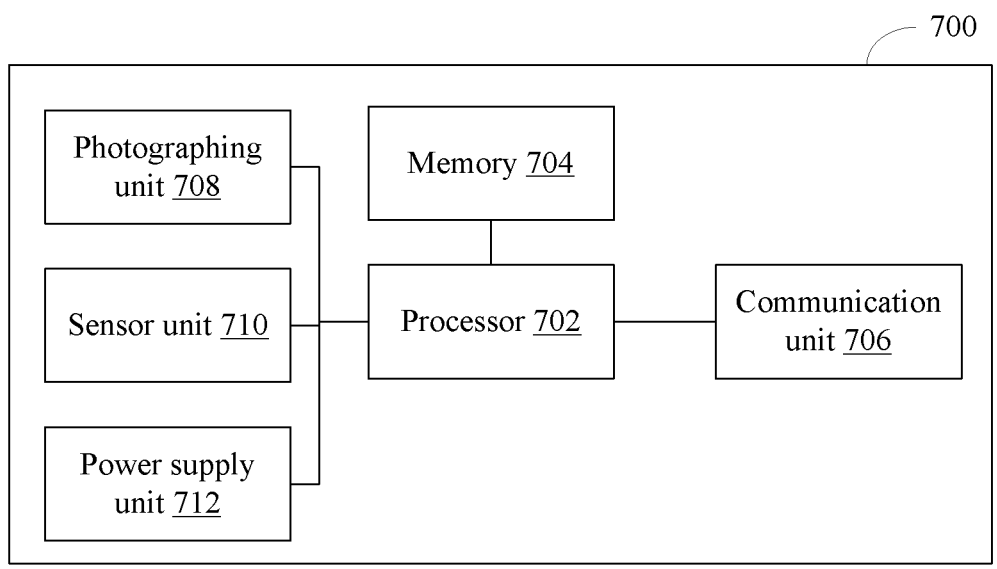
FIG. 7 is a block diagram of one embodiment of a cleaning robot.

FIG. 7 illustrates a block diagram of a cleaning robot 700 according to one embodiment.

The cleaning robot 700 comprises at least one processor 702, a memory 704, a communication unit 706, a photographing unit 708, a sensor unit 710, and a power supply unit 712. It should be understood that the composition of the cleaning robot 700 shown in FIG. 7 does not constitute a limitation of the embodiment. Other examples of the cleaning robot 700 may comprise more or less other hardware or software than shown in the figure, or have different component arrangements.

In one embodiment, the at least one processor 702 comprises integrated circuits, for example, a single packaged integrated circuit, or may be composed of multiple integrated circuits with the same function or different functions, comprising one or a combination of multiple central processing units (Central Processing Unit, CPU), microprocessors, digital processing chips, graphics processors, and various control chips. The at least one processor 702 is the control core (Control Unit) of the cleaning robot 700, which uses various interfaces and lines to connect various components of the cleaning robot 700, and by running or executing programs or modules stored in the memory 704, and call the data stored in the memory 704 to perform various functions and process data of the cleaning robot 700, for example, perform a cleaning area specifying function. The processor 702 is also used to interact with other components.

The memory 704 comprises a read-only memory (Read-Only Memory, ROM), a programmable read-only memory (Programmable Read-Only Memory, PROM), and an erasable programmable read-only memory (Erasable Programmable Read-Only Memory, EPROM), One-time Programmable Read-Only Memory (OTPROM), Electrically-Erasable Programmable Read-Only Memory (EEPROM), CD-ROM (Compact Disc Read-Only Memory, CD-ROM) or other optical disk storage, magnetic disk storage, tape storage, or any other computer-readable storage medium that can be used to carry or store data.

The memory 704 stores program codes, and the at least one processor 702 can call up the program codes stored in the memory 704 to perform related functions. For example, the program code of the method flow of FIG. 5 is executed by the at least one processor 702, so as to realize the functions of the various modules to achieve the purpose of specifying the cleaning area.

In one embodiment, the memory 704 stores one or more instructions (that is, at least one instruction), and the at least one instruction is executed by the at least one processor 702 to achieve the purpose of specifying the cleaning area. For details, refer to FIG. 5 shown.

The communication unit 706 is used for wireless communication between the cleaning robot 700 and other devices. The cleaning robot 700 can access a wireless network based on a communication standard via the communication unit 706, such as WI-FI, 2G, 3G, 4G, or 5G, or a combination thereof. In one embodiment, the communication unit 706 further comprises near-field communication (NFC), radio frequency identification (RFID), ultra-wideband (UWB), BLUETOOTH, and other technologies.

The photographing unit 708 is used to collect images of the environment.

The sensor unit 710 comprises a distance measuring sensor and a collision sensor for detecting distance and impacts with obstacles.

The power supply unit 712 comprises a charging base docking component that can be docked to the charging base, and is used to supply power to each component of the cleaning robot 700.

In summary, the cleaning area specify method, mobile device, and cleaning robot utilize the camera of the mobile device to capture the images of indoor environment and specify a cleaning area, and notify the cleaning robot in real time to go to clean.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for specifying a cleaning area, the method comprising:
   capturing, by a mobile device, an image of a two-dimensional code label arranged on a top of a cleaning robot parked on a charging base;
   obtaining, by the mobile device, a positional relationship between the mobile device and the cleaning robot according to the captured image, wherein the positional relationship comprises a horizontal distance and an angle;
   determining, by the mobile device, an initial positional information of the mobile device on an indoor two-dimensional map of the cleaning robot according to the positional relationship;
   transmitting, by the mobile device, the initial positional information to the cleaning robot and controlling the cleaning robot to enter a person following mode;
   recording, by the mobile device, a movement distance and a rotation angle relative to the initial positional information and informing the cleaning robot the recorded movement distance and the recorded rotation angle;
   performing, by the cleaning robot, the person following mode according to the recorded movement distance and the recorded rotation angle;
   capturing, by mobile device, an indoor environment and receiving touch inputs of the cleaning area of the indoor environment through a touch display screen of the mobile device;
   updating, by the mobile device, a current position of the mobile device according to the initial positional information, the recorded movement distance, and the recorded rotation angle;
   obtaining, by the mobile device, a positional relationship between the mobile device and a center point of the indoor environment;
   determining, by the mobile device, a coordinate value of the center point of the indoor environment according to the current position of the mobile device and the positional relationship between the mobile device and the center point of indoor environment;
   obtaining, by the mobile device, a plurality of coordinate values of the cleaning area on the indoor two-dimensional map according to the coordinate value of the center point of the indoor environment and a focal length of the captured indoor environment; and
   transmitting, by the mobile device, the plurality of coordinate values of the cleaning area to the cleaning robot and controlling the cleaning robot to enter a cleaning mode.

2. The method of claim 1, wherein the initial positional information comprises X-axis coordinate values, Y-axis coordinate values and angle values of the mobile device on the indoor two-dimensional map.

3. A mobile device for specifying a cleaning area, comprising: a memory storing instructions; and a processor coupled to the memory and, when executing the instructions, configured for:
   capturing an image of a two-dimensional code label arranged on a top of a cleaning robot parked on a charging base;
   obtaining a positional relationship between the mobile device and the cleaning robot according to the captured image, wherein the positional relationship comprises a horizontal distance and an angle;
   determining an initial positional position of the mobile device on an indoor two-dimensional map of the cleaning robot according to the positional relationship;
   transmitting the initial positional information to the cleaning robot and controlling the cleaning robot to enter a person following mode;
   recording a movement distance and a rotation angle relative to the initial positional information and informing the cleaning robot to perform the person following mode according to the recorded movement distance and the recorded rotation angle;
   capturing an indoor environment and receiving touch inputs of the cleaning area of the indoor environment through a touch display screen of the mobile device;
   updating a current position of the mobile device according to the initial positional information, the recorded movement distance, and the recorded rotation angle;

obtaining a positional relationship between the mobile device and a center point of the indoor environment;

determining a coordinate value of the center point of the indoor environment according to the current position of the mobile device and the positional relationship between the mobile device and the center point of indoor environment;

obtaining a plurality of coordinate values of the cleaning area on the indoor two-dimensional map according to the coordinate value of the center point of the indoor environment and a focal length of the captured indoor environment; and transmitting the plurality of coordinate values of the cleaning area to the cleaning robot and controlling the cleaning robot to enter a cleaning mode.

* * * * *